United States Patent [19]

Campbell et al.

[11] Patent Number: 5,026,504
[45] Date of Patent: Jun. 25, 1991

[54] CURING COMPOSITION FOR POLYSULPHIDE POLYMERS

[75] Inventors: John S. Campbell, Gerrards Cross; Michael E. Foulkes, Plymouth, both of United Kingdom

[73] Assignee: Cookson Group PLC, London, United Kingdom

[21] Appl. No.: 480,886

[22] Filed: Feb. 16, 1990

Related U.S. Application Data

[63] Continuation of Ser. No. 52,779, May 21, 1987, abandoned.

[30] Foreign Application Priority Data

May 23, 1986 [GB] United Kingdom ............... 862707

[51] Int. Cl.$^5$ ...................... C08F 28/00; C01B 15/047
[52] U.S. Cl. .................. 252/186.43; 252/186.38; 252/182.33; 528/374
[58] Field of Search ............... 252/182.33, 186.38, 252/186.43; 528/374

[56] References Cited

U.S. PATENT DOCUMENTS

| | | | |
|---|---|---|---|
| 3,923,748 | 12/1975 | Hutt et al. | 528/374 |
| 4,020,033 | 4/1977 | Dannels | 528/374 |
| 4,082,712 | 4/1978 | Dannels | 528/374 |
| 4,100,148 | 7/1978 | Hockenberger et al. | 528/374 |
| 4,104,189 | 8/1978 | Hertwig et al. | 528/374 |
| 4,173,557 | 11/1979 | Strecker et al. | 252/183.11 |
| 4,277,360 | 7/1981 | Mellors | 252/182.1 |
| 4,631,141 | 12/1986 | Baxter | 252/186.38 |
| 4,698,407 | 10/1987 | Nakagima et al. | 528/24 |
| 4,728,712 | 3/1988 | Singh et al. | 528/373 |

FOREIGN PATENT DOCUMENTS 1561178 2/1980 United Kingdom .

OTHER PUBLICATIONS

Giovanoli et al, *Helvetica Chimica Act*, 53(2), 209–220 (1970).

*Clays and Clay Minerals*, vol. 34, No. 5, 1986, pp. 565–571.

*Primary Examiner*—Edward A. Miller
*Attorney, Agent, or Firm*—Kenyon & Kenyon

[57] ABSTRACT

A curing composition for curing a polysulphide polymer, which composition comprises as the curing agent sodium birnessite, $Na_4Mn_{14}O_{27}\cdot 9H_2O$.

A process for the preparation of sodium birnessite comprises the steps of adding excess in the range of from 25% to 225% of a solution of sodium hydroxide to a solution of manganese (II) chloride or manganese (II) sulphate to form a slurry of manganese (II) hydroxide and passing air free of carbon dioxide therethrough for at least 3 hours or oxygen for 1.5 hours, these steps being carried out at ambient temperature.

6 Claims, No Drawings

CURING COMPOSITION FOR POLYSULPHIDE POLYMERS

This application is a continuation, of application Ser. No. 07/052,779, filed May 21, 1987, now abandoned.

The present invention relates to curing compositions for polysulphide polymers, to a process for the preparation of the curing agent contained in these curing compositions and to a process for curing polysulphide polymers.

Certain curing agents for polysulphide polymers are disclosed in GB-A-1561178. This Specification discloses a curing agent suitable for inclusion in a polysulphide composition, which comprises a manganese (IV) oxide having a foreign metal content of from 1.0% to 15%, at least 0.1% of which is alkali metal and at most 10% is a metal other than manganese or alkali metal, a water content of from 0.1 to 8%, and a specific surface of from 5 to 20 $m^2g^{-1}$., measured by the BET method. These curing agents may be prepared by heating manganese (IV) oxide with sodium hydroxide solution in an autoclave. Examples of these curing agents are compounds of the formula $Na_{0.70}MnO_{2+y}$, where y is from 0 to 0.25. We have now surprisingly discovered that sodium birnessite, $Na_4Mn_{14}O_{27}.9H_2O$, is an extremely rapid curing agent for polysulphide polymers.

Accordingly, the present invention provides a curing composition for curing a polysulphide polymer, which composition comprises as the curing agent sodium birnessite, $Na_4Mn_{14}O_{27}.9H_2O$.

The curing compositions of the present invention may contain the sodium birnessite in substantially pure form or may contain the sodium birnessite as an admixture with hausmannite in an approximate ratio of sodium birnessite:hausmannite of 95:5.

The sodium birnessite preferably has a specific surface, measured by the adsorption of argon from a flowing mixture of argon and helium, at liquid nitrogen temperatures, of above 20 $m^2g^{-1}$. More preferably the sodium birnessite has a specific surface of 25 $m^2g^{-1}$, or above.

The curing compositions of the present invention will generally contain an accelerator for the polysulphide curing reaction, for example tetramethyl thiouram disulphide.

The curing compositions of the present invention are preferably in the form of a paste which can be readily formed by mixing the sodium birnessite and any other additives with an organic liquid, such as a chlorinated aliphatic hydrocarbon.

The curing compositions may also include therein an inert filler, such as calcium carbonate, or a diluent such as manganese dioxide. The inclusion of a filler or a diluent in the compositions is accompanied by some deceleration of curing.

The present invention also includes within its scope a method of curing a polysulphide polymer which method comprises blending the polysulphide polymer with sodium birnessite, $Na_4Mn_{14}O_{27}.9H_2O$, or with a curing composition comprising sodium birnessite, and allowing the polymer to cure.

Sodium birnessite, $Na_4Mn_{14}O_{27}.9H_2O$, has been known heretofore as a chemical curiosity only (see Helvetica Chimica Act 53(2), 209-220 (1970) by R. Giovanoli, E. Stahli and W. Feitknecht). The literature method of making it is to pass a current of oxygen for four to five hours, at room temperature, through a slurry of manganese (II) hydroxide made in its turn by adding an excess of caustic solution to a solution of manganese (II) nitrate. We have found that manganese (II) sulphate or manganese (II) chloride can replace the nitrate and air can replace oxygen. It is, however, essential to free the stream of air from carbon dioxide by passing it through a suitable absorbent such as soda-lime.

The present invention thus includes within its scope a process for the preparation of sodium birnessite, $Na_4Mn_{14}O_{27}.9H_2O$, which process comprises the steps of adding an excess of a solution of sodium hydroxide to a solution of manganese (II) chloride to form a slurry of manganese (II) hydroxide and passing air free of carbon dioxide therethrough for at least 3 hours or oxygen for at least 1.5 hours, these steps being carried out at ambient temperature.

The passage of air free of carbon dioxide through the reaction mixture is preferably effected for a period of about 4½ hours, in order to ensure substantially complete oxidation.

After carrying out the reaction the product is filtered off, preferably washed, and then dried. The drying may be effected either at 100° C. in an oven or at ambient temperature under vacuum, the latter being the preferred method. It is necessary to limit the amount of washing and thus retain a little alkalinity in the product. Otherwise a partial conversion takes place to hausmannite, $Mn_3O_4$, a rather stable oxide of manganese which has very little activity as a curing agent.

The limited washing is carried out with a volume of water which is insufficient to render the product neutral and in practice it has been found that an amount of water approximately equal to one-half of the volume of the suspension is appropriate. The product may also be left unwashed.

The process is carried out at ambient temperature since at elevated temperatures the product obtained is hausmannite or contains large quantities of hausmannite.

The present invention will be described with reference to the following Examples.

In these examples an appropriate determination of the relative amounts of sodium birnessite and hausmannite in the products was made in the following manner.

The diffractometer pattern is recorded over the angular range $2\theta = 5-60°$ using a Siemens Type F or D500 X-ray powder diffractometer using copper-K$\alpha$ radiation generated at 35 kV or 40 kV, respectively. The principal peaks of sodium birnessite and of hausmannite occur at 12.5° and 36.1°, respectively, and their relative intensities are used to give an indication of the relative amounts of the two phases present. The manganese in sodium birnessite fluoresces in Cu-K$\alpha$ radiation and prevents accurate quantitative analysis.

Specific surface measurements were carried out by the adsorption of argon from a flowing mixture of argon and helium at liquid nitrogen temperatures, using a 'Flowsorb' apparatus (Coulter Instruments Ltd).

EXAMPLE 1

275 g of sodium hydroxide were dissolved in 1.2 liters of deionised water and the solution added slowly to a manganese nitrate solution made by dissolving 143.5 g of manganese nitrate in one liter of deionised water. The slurry was stirred for 4½ hours during which time a stream of air free from carbon dioxide was passed through the slurry at a rate of 10 liters per minute. The product was filtered off, washed with deionised water, and dried under vacuum. The dried powder had a sodium birnessite-hausmannite ratio of approximately 80:20 and a specific surface of 22.9 $m^2g^{-1}$. The sodium content was 4.8%, confirming that washing had been excessive and that some conversion to hausmannite had taken place (sodium birnessite should contain 6.3% sodium).

EXAMPLE 2

A solution of manganese (II) sulphate was prepared by adding 27 ml of sulphuric acid (96%) to a suspension of 43.5 g of chemically pure manganese (IV) oxide in 1 liter of deionised water. The suspension was stirred with heating and 15 g of hydroxyammonium chloride was added. The solution was cooled to room temperature and 275 g of sodium hydroxide dissolved in 1 liter of water was added slowly to the solution. The slurry so-formed was stirred for 4 hours during which time a stream of air free from carbon dioxide was passed therethrough at a rate of 10 liters per minute. The product was washed with a limited amount of deionised water (1 liter), and then dried. The sodium birnessite-hausmannite ratio was approximately 95:5 and the specific surface was 22.3 $m^2g^{-1}$, the sodium content was 8.1%.

A blend of five batches made in a similar way showed a similar sodium birnessite-hausmannite ratio (95:5) and a specific surface of 20.7 $m^2g^{-1}$.

EXAMPLE 3

57.5 g of manganese carbonate was suspended in 1.0 liter deionised water and 88 ml hydrochloric acid (34% weight) added thereto. The suspension was stirred with heating while 2 g hydroxyammonium chloride was added thereto. The solution was then cooled to room temperature and 275 g of sodium hydroxide dissolved in 1 liter of water was added slowly to the solution of manganese chloride. The slurry so-formed was stirred for 4 hours during which time a stream of air free from carbon dioxide was passed therethrough at a rate of 10 liters per minute.

The product was worked up according to Example 2. The sodium birnessite-hausmannite ratio was approximately 95:5.

EXAMPLE 4

143.5 g of manganese nitrate hexahydrate was dissolved in deionised water and the solution made up to 1 liter. 275 g of sodium hydroxide dissolved in 1 liter of water was added slowly to the solution of manganese nitrate. The slurry so-formed was stirred for four hours during which time a stream of air free from carbon dioxide was passed therethrough at a rate of 10 liters per minute.

The product was worked up according to Example 2. The sodium birnessite-hausmannite ratio was approximately 95:5.

EXAMPLE 5

115 g of manganese carbonate was suspended in 1 liter deionised water and 55 ml sulphuric acid (96% weight) was added thereto. The suspension was stirred with heating while 2 g hydroxyammonium chloride was added thereto. The procedure of Example 3 was then followed.

The sodium birnessite-hausmannite ratio of the product was approximately 95:5.

EXAMPLE 6

151 g of manganese sulphate was dissolved in deionised water and the solution made up to 1 liter. 275 g of sodium hydroxide dissolved in 1 liter of water was added slowly to the solution of manganese sulphate. The slurry so-formed was stirred for 1½ hours during which time oxygen was bubbled therethrough.

The product was then worked up according to Example 2. The product was entirely sodium birnessite, with no hausmannite detected.

EXAMPLE 7

151 g of manganese sulphate was dissolved in deionised water and the solution made up to 1 liter. 110 g of sodium hydroxide dissolved in 1 liter of water was added slowly to the solution of manganese sulphate. The slurry so-formed was stirred for 2 hours during which time a stream of oxygen was passed therethrough at a rate of 10 liters per minute. The product was then worked up according to Example 2. The product was sodium birnessite, with no hausmannite dectected.

EXAMPLE 8

377.5 g of manganese sulphate was dissolved in tap water and the solution made up to 2.5 liters. 2.148 kg of a commercial 32% sodium hydroxide solution was made up to 2.5 liters and was added slowly to the solution of manganese sulphate. The slurry so formed was stirred for 3 hours during which time oxygen was bubbled therethrough at the rate of 10 liters per minute.

The product was then worked up according to Example 2. The product was sodium birnessite, with no hausmannite detected.

A sample removed from the reaction vessel after 1½ hours produced identical analytical results.

EXAMPLE 9

151 g of manganese sulphate was dissolved in deionised water and the solution made up to 1 liter. 110 g of sodium hydroxide dissolved in 1 liter of water was added slowly to the solution of manganese sulphate. The slurry so-formed was stirred for 4 hours during which time a stream of oxygen was passed therethrough at a rate of 0.5 liters per minute. The product was then worked up according to Example 2. No hausmannite was found in the product, which consisted of sodium birnessite and amorphous material.

EXAMPLE 10

422.5 g of manganese sulphate monohydrate was dissolved in tap water and the solution made up to 2.5 liters. 275 g of sodium hydroxide dissolved in 2.5 liters of water was added slowly to the solution of manganese sulphate. The slurry so-formed was stirred for 10 hours during which time a stream of oxygen was passed therethrough at a rate of 0.5 liters per minute. The product was filtered and dried without washing. The product was entirely sodium birnessite.

A sample removed after 6 hours produced identical results.

EXAMPLE 11

422.5 g of manganese sulphate monohydrate was dissolved in tap water and the solution made up to 2.5 liters. 275 g of sodium hydroxide dissolved in 2.5 liters of water was added slowly to the solution of manganese sulphate. The slurry so-formed was stirred for 6 hours during which time a stream of oxygen was passed therethrough at a rate of 5 liters per minute. The product was filtered and dried without washing. No hausmannite was found in the product, which consisted of sodium birnessite and amorphous material. The product has identical activity to pure sodium birnessite in a cure test.

A sample removed from the reaction vessel after two hours produced identical results.

EXAMPLE 12

690 g of manganese carbonate was suspended in 6 liters of deionised water and 1056 ml hydrochloric acid (34% weight) was added thereto. The suspension was stirred with heating while 12 g hydroxyammonium chloride was added thereto. The procedure of Example 3 was followed except that six times the quantity of sodium hydroxide was used and that air free of carbon dioxide was passed through the suspension only for 3 hours.

The sodium birnessite-hausmannite ratio of the product was approximately 95:5.

The effects of changing some process variables are summarised in Tables 1 to 5.

Tables 1 and 2 show how the percentage of sodium birnessite in the filtered product increases with increasing reaction time. In the experiments recorded in these tables 100 ml aliquots of the suspension were removed at intervals during the reaction, filtered and dried.

Tables 3 and 4 show how over-washing and the presence of carbon dioxide in the air stream can affect the product composition.

Table 5 shows the adverse effect of temperature on the reaction. In each case, the reduced yield of sodium birnessite is accompanied by a corresponding increase in the yield of hausmannite.

TABLE 1

| Product composition as a function of oxidation time using carbon dioxide free air | | |
|---|---|---|
| Oxidation time (hr) | Birnessite content (%) | Hausmannite content (%) |
| 0.5 | 0 | 100 |
| 1 | 0 | 100 |
| 1.5 | 5 | 95 |
| 2 | 62 | 38 |
| 2.5 | 75 | 25 |
| 3 | 95 | 5 |
| 3.5 | 95 | 5 |
| 4 | 95 | 5 |

TABLE 2

| Product composition as a function of oxidation time using O$_2$ | | |
|---|---|---|
| Oxidation time (hour) | Birnessite Content (%) | Hausmannite Content (%) |
| 0.25 | 0 | 100 |
| 0.50 | 0 | 100 |
| 0.75 | 2 | 98 |
| 1.00 | 25 | 75 |
| 1.25 | 75 | 25 |
| 1.50 | 95 | 5 |
| 1.75 | 95 | 5 |
| 2.00 | 95 | 5 |

TABLE 3

| Product composition as a function of amount of wash water | | |
|---|---|---|
| Volume of wash water expressed as multiple of suspension volume (x) | Birnessite content (%) | Hausmannite content (%) |
| 2.5 x | 67 | 33 |

TABLE 3-continued

| Product composition as a function of amount of wash water | | |
|---|---|---|
| Volume of wash water expressed as multiple of suspension volume (x) | Birnessite content (%) | Hausmannite content (%) |
| 0.5 x | 95 | 5 |

TABLE 4

| Product composition as a function of CO$_2$ content of air | | |
|---|---|---|
| Air | Birnessite content (%) | Hausmannite content (%) |
| CO$_2$ free | 95 | 5 |
| CO$_2$ present | 57 | 43 |

TABLE 5

| Product composition as a function of temperature | | |
|---|---|---|
| Temperature (°C.) | Birnessite Content (%) | Hausmannite Content (%) |
| Reactants and suspension maintained at 25 | 95 | 5 |
| Reactants and suspension maintained at 35 | 20 | 80 |
| Reactants and suspension maintained at 50 | 0 | 100 |
| Reactants mixed at 25, suspension heated to 50 | 0 | 100 |

A test for the efficacy of curing agents is carried out as follows. The solid curing agent is made into a paste of the following composition:

Manganese based curing agent: 10 parts by weight.
Cereclor 63 (a chlorinated hydrocarbon): 12 parts by weight.
Tetramethyl thiouram disulphide ("TMTD" accelerator): 0.5 parts.
(Sometimes more Cereclor is needed to get a smooth paste).

For a simple test, an amount of paste equivalent to ten parts of curing agent is mixed with 100 parts of polysulphide polymer LP32C (Thiokol Chemicals Ltd) in a glove box maintained at 23° C. and 50% relative humidity. The time to cure is determined with the aid of a Tecam GT3 preset viscosity gelation timer, a device which continually inserts a needle into the mixture until a preset viscosity has been reached, and then stops automatically.

In a test with a building sealant composition, 22.5 parts of paste, equivalent to 10 parts of curing agent, are mixed with 275 g of a base sealant containing 100 g of LP32C with fillers and other additives, and the time to cure is determined by timing the onset of brittle fracture in threads of the mixture withdrawn at intervals from the mass.

In the following Table 6, the Prior Art samples 1 and 2 are commercially available curing agents based on manganese (IV) oxide and made available by Chemetal AG under the reference codes 6-314A and 7-032.

TABLE 6

| | Worklife in Sealant | | | Cure in LP32C (Tecam) | |
|---|---|---|---|---|---|
| | Hrs. | Mins | Shore A (7 Day) | Mins. | Shore A (7 day) |
| Sodium birnessite | 0 | 35 | 32 | 8 | 39 |

TABLE 6-continued

| | Worklife in Sealant | | | Cure in LP32C (Tecam) | |
|---|---|---|---|---|---|
| | Hrs. | Mins | Shore A (7 Day) | Mins. | Shore A (7 day) |
| Prior art 6-314A | 5 | 30 | 32 | 135 | 35 |
| Prior art 7-032 | 5 | 00 | 33 | 120 | 37 |

The Shore A Hardness is an indicator of the hardness as determined by a particular instrument.

It can be seen from the results in Table 6 that the curing agent of the present invention is very much faster than the prior art curing agents.

It has been found that the curing agents of the present invention may be decelerated using inert fillers, such as calcium carbonate (Polycarb S), and, at higher dilutions, with manganese dioxide. This may be advantageous for certain uses. The following Table 7 illustrates these properties.

TABLE 7

| Parts per 100 parts LP32C | | Worklife in Sealant | | | Cure in LP32C (Tecam) | |
|---|---|---|---|---|---|---|
| Sodium Birnessite | Polcarb S | Hrs | Mins | Shore A (7-day) | Mins | Shore A (7-day) |
| 10 | — | 0 | 25 | 32 | 8 | 39 |
| 9 | 1 | 0 | 25 | 33.5 | 13 | 39 |
| 7.5 | 2.5 | 0 | 40 | 37.5 | 16 | 39 |
| 6.6 | 3.4 | 1 | 15 | 27 | 20 | 39 |
| 5 | 5 | 1 | 45 | 23.5 | 24 | 33.5 |
| 2.5 | 7.5 | overnight | | <5 | 124 | 10 |
| Sodium Birnessite | $MO_2$ | | | | | |
| 6.6 | 3.4 | 1 | 00 | 30 | 15 | 38 |
| 5 | 5 | 1 | 35 | 27 | 21 | 39 |
| 4 | 6 | 2 | 10 | 29 | 22 | 37 |
| 2.5 | 7.5 | 5 | 15 | 26.5 | 25 | 39 |

We claim:

1. A composition for curing a polysulphide polymer, the composition comprising a curing agent which consists essentially of sodium birnessite, $Na_4Mn_{14}O_{27}.9H_2O$, containing not more than about 5 percent hausmannite, $Mn_3O_4$, by total weight of sodium birnessite and hausmannite and a chlorinated aliphatic hydrocarbon mixed with the curing agent to form a paste.

2. A composition according to claim 1 wherein the curing agent consists essentially of sodium birnessite-hausmannite in a weight ratio of approximately 95:5.

3. A composition according to claim 1 wherein the sodium birnessite has a specific surface, measured by the adsorption of argon from a flowing mixture of argon and helium, at liquid nitrogen temperatures, of above 20 $m^2g^{-1}$.

4. A composition according to claim 1 further comprising an accelerator combined in said paste.

5. A composition according to claim 1 further comprising an inert filler combined in said paste.

6. A composition according to claim 1, further comprising manganese dioxide as a diluent, the amount by weight of manganese dioxide being not more than about three times the amount by weight of sodium birnessite.

* * * * *